United States Patent Office  3,634,440
Patented Jan. 11, 1972

3,634,440
ALKYL ESTERS OF 6-(BENZOYL) TRIHALO-2-PICOLINIC ACID
R. Garth Pews and E. B. Nyquist, Midland, Mich., assignors to The Dow Chemical Company, Midland, Mich.
No Drawing. Filed Sept. 18, 1969, Ser. No. 859,183
Int. Cl. C07d 31/36
U.S. Cl. 260—295 R        5 Claims

ABSTRACT OF THE DISCLOSURE

Disclosed are alkyl esters of 6-(benzoyl)-trihalo-2-picolinic acid and their preparation. These compounds are useful as pesticides.

SUMMARY OF THE INVENTION

The present invention is directed to alkyl esters to 6-(benzoyl)trihalopyridines corresponding to the formula

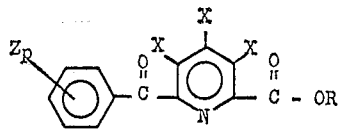

In this and succeeding formula, X represents chloro, fluoro or bromo; Z represents chloro, fluoro, bromo or loweralkyl of 1 to 4 carbon atoms, inclusive; p represents an integer of 1 or 2; and R represents loweralkyl of 1 to 4 carbon atoms, inclusive.

The expression "loweralkyl" is employed in the present specification and claims to designate a straight or branched chain alkyl radical containing from 1 to 5 carobn atoms, inclusive, such as, for example, methyl, ethyl, isopropyl, propyl, 1,1-dimethyl propyl, tert-butyl and n-butyl.

The alkyl esters of the present invention are crystalline solids which are of low solubility in water and of moderate solubility in many common organic solvents. These compounds are suitable for use as pesticides in the control of various pests such as fungi, bacteria and insects.

The compounds of the present invention are prepared by the reaction of a benzoyl cyanide with 5,5-dialkoxy-1,2,3,4-tetrahalocyclopentadiene. The reaction can be carried out in the presence of an inert organic solvent if desired. This reaction can be represented as follows:

wherein Z, X, p and R are as hereinbefore defined.

The reaction consumes the reactants in a ratio of one mole of the benzoyl cyanide per mole of the 5,5-dialkoxy-1,2,3,4-tetrahalocyclopentadiene and the employement of such proportions is preferred.

The reaction proceeds under ambient pressure at temperatures of from about 100° to about 250° C. The two reactants are intimately contacted together, and if desired, the contacting can be carried out in the presence of an inert organic solvent such as, for example, decahydronaphthalene and sulfolane.

The reactants are usually mixed at ambient temperature and brought to a temperature of between about 100° to about 250° C. and held there until the reaction is complete. Depending upon the rate of reaction, the reaction mixture may be held at the above temperature for a period of time up to about 50 hours. The reaction time depends on the reactants and temperature employed and is usually between about 5 to about 50 hours. After the reaction is complete, the mixture is vacuum distilled to remove the unreacted starting materials. The remaining crude residue is eluted with conventional solvents such as, for example, benzene, chloroform or methylene chloride. The product is freed of solvent by evaporation under reduced pressure. Thereafter, the product is recrystallized from a solvent, such as, for example, ethyl ether, ethyl acetate, hexane or a mixture of hexane and ethyl acetate.

DESCRIPTION OF SOME PREFERRED EMBODIMENTS

The following examples illustrate the present invention and the manner by which it can be practiced but, as such, should not be construed as limitations upon the overall scope of the same.

EXAMPLE 1

Methyl 6-(4'-chlorobenzoyl)-3,4,5-trichloropicolinate

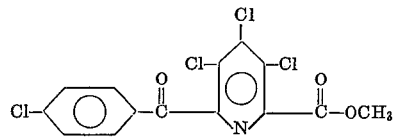

A mixture is prepared containing 22.6 grams (0.1 mole) of 5,5-dmethoxy - 1,2,3,4 - tetrachlorocyclopentadiene and 14.2 grams (0.1 mole) of 4-chlorobenzoyl cyanide. The mixture is heated and maintained at a temperature between 185° and 190° for 13½ hours. The reaction mixture is thereafter vacuum distilled and the unreacted starting material removed. Hexane (100 milliliters) is added to the oily residue which remains and the mixture filtered to recover the crude methyl 6-(4'-chlorobenzoyl)-3,4,5-trichloropicolinate product. Recrystallization from hexane gives 13.0 grams (40 percent of theoretical) of the product melting at 132°–134° C. The product is found by analysis to have carbon, hydrogen, chlorine and nitrogen contents of 44.8, 1.8, 37.2 and 3.9 percent, respectively, as compared with the theoretical contents of 44.4, 1.9, 37.4 and 3.7 percent, respectively, calculated for the named structure.

EXAMPLE 2

Methyl 6-(4'-fluorobenzoyl)-3,4,5-trichloropicolinate

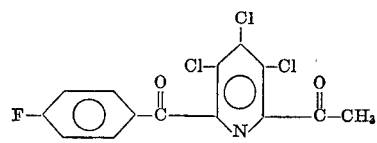

A mixture is prepared containing 29.4 grams (0.1 mole) of 5,5 - dimethoxy-1,2,3,4-tetrachlorocyclopentadiene and 15.0 grams (0.1 mole) of p-fluorobenzoyl cyanide. The mixture is brought to 190° C. and maintained at this temperature for 17 hours. The reaction mixture is thereafter vacuum distilled and the unreacted starting material removed. The crude methyl 6-(4'-fluorobenzoyl)-3,4,5-trichloropicolinate product is recovered by eluting from silica gel with a mixture of hexane and ethyl acetate (90:10) and recrystallized from hexane. The product is obtained in a yield of 10 grams, having a melting point of 133°–135° C. The product is found by analysis to have carbon, hydrogen, chlorine, nitrogen and fluorine contents of 46.7, 1.9, 29.1, 3.9 and 5.3 percent, respectively, as compared with the theoretical contents of 46.4, 2.0, 29.3, 3.9 and 5.2 percent, respectively, calculated for the named structure.

The following compounds of the present invention are prepared in accordance with the methods herein set forth (M.P. and M.W. designate melting point and molecular weight, respectively).

Methyl 6 - (2'-chlorobenzoyl)-3,4,5-trichloropicolinate (M.P. 132°–134° C.) from the reaction of 5,5-dimethoxy-1,2,3,4 - tetrachlorocyclopentadiene and 2 - chlorobenzoyl cyanide.

Ethyl 6 - (2' - chlorobenzoyl)-3,4,5-trichloropicolinate (M.W. 378.9) from the reaction of 5,5-diethoxy-1,2,3,4-tetrachlorocyclopentadiene and 2-chlorobenzoyl cyanide.

Propyl 6 - (4'-fluorobenzoyl)-3,4,5-trifluoropicolinate (M.W. 341) from the reaction of 5,5-dipropoxy-1,2,3,4-tetrafluorocyclopentadiene and p-fluorobenzoyl cyanide.

Butyl 6-(4'-bromobenzoyl) - 3,4,5 - tribromopicolinate (M.W. 697.9) from the reaction of 5,5-dibutoxy-1,2,3,4-tetrabromocyclopentadiene and p-bromobenzoyl cyanide.

Methyl 6 - (2', 4'-dichlorobenzoyl)-3,4,5-trichloropicolinate (M.P. 135°–136° C.) from the reaction of 5,5-dimethoxy - 1,2,3,4 - tetrachlorocyclopentadiene and 2,4-dichlorobenzoyl cyanide.

Methyl 6 - (4'-toluoyl)-3,4,5-trichloropicolinate (M.P. 151°–153° C.) from the reaction of 5,5-dimethoxy-1,2,3,4-tetrachlorocyclopentadiene and p-toluoyl cyanide.

Methyl 6-(4'-butylbenzoyl) - 3,4,5 - trichloropicolinate (M.W. 400.4) from the reaction of 5,5-dimethoxy-1,2,3,4-tetrachlorocyclopentadiene and p-butylbenzoyl cyanide.

In accordance with the present invention, it has been discovered that the alkyl esters of 6-(benzoyl)trihalopyridine compounds can be employed as pesticides for the control of many bacterial, terrestrial and aquatic plants, fungal and insect pests. They can be applied to the aerial portions of many growing plants to control leaf-attacking fungal organisms or dispersed in soil or applied to plant seeds to control the root and seed attacking organisms of mold and damping off. In still other operations they can be applied to orchard floor surfaces to control overwintering spores of many fungal organisms. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay. They also can be employed as a toxicant to control insect pests.

The exact concentrations of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. It is also often convenient to apply the compounds as wettable powders.

In a representative operation, each of the compounds methyl 6 - (4'-fluorobenzoyl)-3,4,5-trichloropicolinate and methyl 6-(2',4'-dichlorobenzoyl)-3,4,5-trichloropicolinate when employed in an aqueous dispersion as the sole toxicant therein and at a concentration of 400 parts per million parts of the ultimate dispersion gives substantially complete kill and control of rice blast organism.

In another representative operation, methyl 6-(4'-toluoyl)-3,4,5-trichloropicolinate when employed in an aqueous suspension as the sole toxicant therein at a concentration of 500 parts per million parts of the utimate suspension gives 100 percent kill and control of Southern army worms.

In other operations, methyl 6-(4'-chlorobenzoyl)-3,5,6-trichloropicolinate at the above dosage rate gives 100 percent kill and control of two-spotted spider mites.

PREPARATION OF STARTING MATERIALS

The 5,5-dialkoxy-1,2,3,4-tetrahalocyclopentadiene compounds employed as starting materials are prepared by the reaction of a hexahalocyclopentadiene with the corresponding alkali alkoxide. This reaction is usually carried out in an inert solvent.

The benzoyl cyanides are prepared by the reaction of the corresponding benzoyl chlorides with cuprous cyanides.

What is claimed is:
1. A compound corresponding to the formula

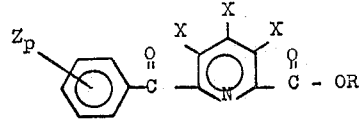

wherein X represents chloro, fluoro or bromo; Z represents chloro, fluoro, bromo or loweralkyl of 1 to 4 carbon atoms, inclusive; p represents an integer of 1 or 2; and R represents loweralkyl of 1 to 4 carbon atoms, inclusive.

2. The compound of claim 1 which is methyl 6-(4'-chlorobenzoyl)-3,5,6-trichloropicolinate.

3. The compound of claim 1 which is methyl 6-(4'-toluoyl)-3,4,5-trichloropicolinate.

4. The compound of claim 1 which is methyl 6-(4'-fluorobenzoyl)-3,4,5-trichloropicolinate.

5. The compound of claim 1 which is methyl 6-(2',4'-dichlorobenzoyl)-3,4,5-trichloropicolinate.

References Cited
UNITED STATES PATENTS 3,251,849    5/1966    Tomita _____ 260—295

OTHER REFERENCES

Jaworski et al., Chem. Abstracts, vol. 52, 11, 037–f–h, August 1958.

Jaworski et al., Chem. Abstracts, vol. 55, 8407–d–e, May 1961.

ALAN L. ROTMAN, Primary Examiner

U.S. Cl. X.R.

424—266

PO-1050
(5/69)

UNITED STATES PATENT OFFICE
CERTIFICATE OF CORRECTION

Patent No. 3,634,440                    Dated   11 January 1972

Inventor(s)  R. Garth Pews and E. B. Nyquist

It is certified that error appears in the above-identified patent and that said Letters Patent are hereby corrected as shown below:

Column 1, line 50, should read "OR" at the end of the formula as follows:

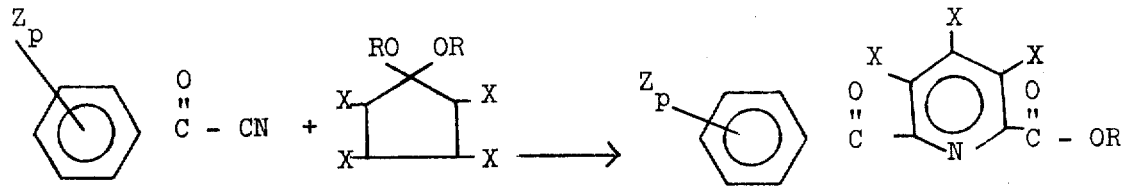

Signed and sealed this 11th day of July 1972.

(SEAL)
Attest:

EDWARD M. FLETCHER, JR.
Attesting Officer

ROBERT GOTTSCHALK
Commissioner of Patents